(12) United States Patent
Yanagiuchi

(10) Patent No.: US 6,521,337 B2
(45) Date of Patent: Feb. 18, 2003

(54) ADHESIVE TAPE FOR PAINTING

(75) Inventor: Katsuyuki Yanagiuchi, Aichi-ken (JP)

(73) Assignee: Lintec Corporation (JP)

( * ) Notice: Subject to any disclaimer, the term of this patent is extended or adjusted under 35 U.S.C. 154(b) by 20 days.

(21) Appl. No.: 09/837,693

(22) Filed: Apr. 18, 2001

(65) Prior Publication Data

US 2002/0015842 A1 Feb. 7, 2002

(30) Foreign Application Priority Data

Apr. 20, 2000 (JP) ........................................ 2000-119318

(51) Int. Cl.⁷ ............................... C09J 7/02; B32B 7/12
(52) U.S. Cl. ..................... 428/354; 428/40.1; 428/41.6; 428/41.7; 428/355 AC
(58) Field of Search ............................ 428/40.1, 41.5, 428/41.6, 41.7, 42.1, 343, 354, 355 AC

(56) References Cited

U.S. PATENT DOCUMENTS

| | | | |
|---|---|---|---|
| 4,550,052 A | | 10/1985 | Malek |
| 4,555,436 A | | 11/1985 | Geurtsen et al. |
| 5,242,751 A | * | 9/1993 | Hartman ..................... 428/324 |
| 5,518,786 A | * | 5/1996 | Johnson et al. ............ 428/40.6 |
| 5,766,731 A | | 6/1998 | Stein et al. |
| 6,096,396 A | * | 8/2000 | Patton et al. ............... 428/40.1 |
| 6,399,193 B1 | * | 6/2002 | Ellison ........................ 428/354 |

FOREIGN PATENT DOCUMENTS

| | | |
|---|---|---|
| EP | 0318230 A2 | 5/1989 |
| WO | WO 97/32293 | 9/1997 |

OTHER PUBLICATIONS

WPI Abstract Accession No. 2000–197532 & FR 2781183 (Disa) dated Jan. 21, 2000 (see Abstract).

* cited by examiner

Primary Examiner—Daniel Zirker
(74) Attorney, Agent, or Firm—Brinks Hofer Gilson & Lione; G. Peter Nichols

(57) ABSTRACT

An adhesive tape for painting includes an adhesive layer having a top surface; a paint layer including paint with the paint layer provided on the top surface of the adhesive layer; and a clear coating layer laminated on the painting layer. Since the painting adhesive tape of the present invention has the paint layer formed of paint itself, this tape is capable of providing excellent color reproduction and color development. The paint layer is preferably formed by spray painting so as to have a thickness of 1 $\mu$m to 20 $\mu$m. The adhesive layer is preferably formed of a pressure-sensitive adhesive containing an acryl-based resin as its major component.

10 Claims, 1 Drawing Sheet

ADHESIVE TAPE FOR PAINTING

BACKGROUND OF THE INVENTION

1. Field of the Invention

This invention relates to an adhesive tape for painting and a method of manufacturing the tape. More specifically, this invention relates to an adhesive tape for painting that is used in painting vehicles such as automobiles and motorcycles and a method of manufacturing the tape.

2. Description of the Prior Art

Recently, there are cases that outer surfaces of body parts of vehicles such as doors, hoods, fenders, roofs of recreational vehicles and side covers and fuel tanks of motorcycle, are painted with two-tone color for providing beautiful images and high quality feeling. Such two-tone color painting has been conventionally carried out by spray painting in which paint is sprayed onto a painted surface after a preliminary treatment such as a primary coating has been made.

Such spray painting requires several steps including spraying a paint and then drying it in each of painted colors, so that it takes a relatively long time to complete all the painting steps, thus resulting in lowered productivity. Further, volatile organic medium is discharged into the atmosphere in each spraying step causing environmental problems.

In order to solve these problems, a coloring method using a colored film for painting has been proposed. According to this method, a colored film having a pressure-sensitive adhesive layer is attached onto a part to be painted for providing coloring. As for the colored films, several types of films have been proposed. For example, a colored film is know that is produced by adding a paint or a pigment into a resin material and then forming the material into a film using a flow casting method and a colored film having a pressure-sensitive adhesive layer containing a pigment for coloring.

However, these colored films do not exhibit satisfactory color development and do not have sufficient reproducibility since the paint or pigment is contained in the resin material or adhesive in a dispersed state. In particular, in colored films of metallic color, uneven coloring (flashing) or streaking is likely to emerge, thus leading to the case that the value of the product is markedly impaired.

In addition, the colored layers or adhesive layers of these colored films have to have a certain thickness for concealing the ground color of the surface to be painted, so that the films have less flexibility. This also results in a poor followability when attaching the film to a part having a large area or a corner part, and therefore the attaching operation is troublesome.

SUMMARY OF THE INVENTION

It is an object of the present invention to provide an adhesive tape for painting which can provide color painting with a simple operation, can be easily attached to a large area part and a corner part, and can provide various paintings with good reproducibility.

In order to achieve the object mentioned above, the present invention is directed to an adhesive tape for painting that comprises an adhesive layer having a top surface; a paint layer including paint and provided on the top surface of the adhesive layer; and a clear coating layer laminated on the paint layer.

According to the present invention, a painting adhesive tape having a paint layer formed of paint itself is realized, so that quite the same finish as that obtained in the case where the paint is directly painted can be obtained. As a result, metallic color painting of a special color hue can be performed with good reproducibility. Further, use of the painting adhesive tape of the present invention can simplify the painting process greatly, so that productivity is markedly improved, resulting in a reduction of cost.

In the present invention, it is preferred that the adhesive tape further comprises a protective tape that is laminated on the clear coating layer. This makes it possible to prevent the clear coating layer from being damaged at the time of transportation of the adhesive tape or of attaching the tape to the painted surface with a squeegee.

Further, it is also preferred that the paint contains urethane-based resin as a base material. Since such urethane-based resins are normally curable at relatively low temperature, the paint layer composed of such paint can be formed with ease.

Furthermore, it is also preferred that the adhesive layer is formed of a pressure-sensitive adhesive which contains acryl based-resin as a major component thereof. The acryl-based adhesives have small initial tacking property and therefore they can be repeatedly peeled off and stuck from and to an adherend, so that they are easy to handle. Further, after sticking, the adhesive force is enhanced with the lapse of time, so that lifting or peeling off will not occur.

Moreover, it is also preferred that the clear coating layer contains urethane-based resin as a major component thereof. Since the urethane-based resins can form sufficiently elastic and flexible paint layers, the painting adhesive tape having such clear coating layer will not be hardened. Further, such clear coating layer has excellent appearance and excellent luster as well as heat resistance, durability, weatherability, and resistance to chemicals, and therefore such a clear coating layer is suitable as a clear coat to be laminated on the paint layer.

Further, in the present invention, it is preferred that the thickness of the paint layer when dried is from about 5 $\mu$m to about 40 $\mu$m, and the thickness of the clear coating layer is from about 5 $\mu$m to about 50 $\mu$m.

Further, in the present invention, it is also preferred that the breaking strength of the tape is from about 0.196 MPa to about 4.9 MPa. This provides the painting adhesive tape to have excellent flexibility and imparts it with sufficient followability for attaching it to a part having a large area or a curved part such as a corner part, and therefore the handling and workability are improved.

Furthermore, it is also preferred that the breaking elongation of the tape be from about 10% to about 150%. If the breaking elongation is less than about 10%, the impact at a low temperature is deteriorated. On the other hand, if the breaking elongation exceeds about 150%, there is a fear that the clear coating layer will give a tacky or sticky feeling. Further, similarly to the above, by setting the breaking elongation to the above range of about 10% to about 150%, the painting adhesive tape can have excellent flexibility and sufficient followability when attaching it to a part having a large area or a curved part such as a corner part, and therefore the handling and workability are improved.

Moreover, the adhesive tape of the present invention is preferably used for painting vehicles. By using the painting adhesive tape of the present invention for painting vehicles, it is possible to make a painting with excellent beautiful image by a simple process. Further, it possible to cope with diversification of design with ease, so that the commercial value of automobiles and the like can be markedly improved.

These and other objects, structures and advantages of the present invention will be apparent when the following description of the preferred embodiment will be considered taken in conjunction with the appended drawing.

DETAILED DESCRIPTION OF THE INVENTION

Figure 1:
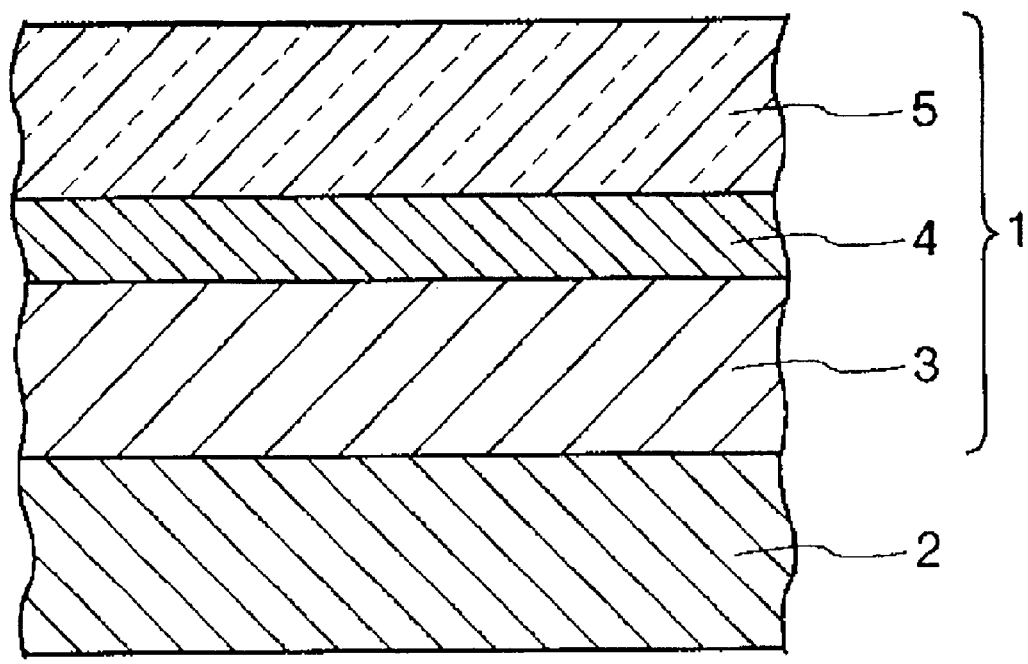
FIG. 1 is a cross-sectional view, which shows an embodiment of an adhesive tape for painting according to the present invention.

Herein below, a preferred embodiment of the present invention will be described with reference to the accompanying drawings.

FIG. 1 is a sectional view that shows an embodiment of an adhesive tape for painting according to the present invention (hereinafter, simply referred to as "painting adhesive tape"). As shown in the drawing, the painting adhesive tape comprises an adhesive layer 3 having a top surface; a paint layer 4 including a paint and provided on the top surface of the adhesive layer 3; and a clear coating layer 5 laminated on the paint layer 4. That is, the clear coating layer 5 is provided on the surface of the paint layer 4, which is opposite to the surface of the paint layer on which the adhesive layer 3 is provided. Since the painting adhesive tape of the present invention has the paint layer 4 formed of paint itself, this tape is capable of providing excellent color reproduction and color development. Therefore, this painting adhesive tape can be substituted for conventional spray painting.

In this painting adhesive tape shown in FIG. 1, a release sheet 2 is attached to the surface of the adhesive layer 3, which is opposite to the surface on which the paint layer 4 is provided.

Hereinafter, detailed descriptions will be made with regard to the respective elements mentioned above.

The adhesive layer 3 of the painting adhesive tape 1 can be formed from conventionally used pressure-sensitive adhesives or heat-sensitive adhesives. Examples of such adhesives include adhesives containing natural rubbers, acryl based resins, ethylene-vinylacetate copolymers, polyurethane, polyester, silicone rubbers, fluoro based rubbers, or polyvinylbutyral as their major component. Among these adhesives, adhesives containing acryl based resins as their major component are particularly preferred because of their heat resistance, transparency, durability, weather ability, and the like. Acryl based adhesives containing acrylicalkester as their major component are especially preferred. This is because the acryl based adhesives containing alkyl acrylate as their major component have a small initial tacking property and therefore they can be repeatedly peeled off and stuck from and to an adhered, so that they are easy to handle. Further, after sticking, the adhesive force is enhanced with the lapse of time, so that floating or peeling off will not occur.

The adhesive layer 3 may optionally contain a tackifier, a softener, an antioxidant, a stabilizer, an ultraviolet absorbent or the like as desired in addition to the adhesive described above.

The thickness of the adhesive layer 3 is not particularly limited to a specific value, but is preferably from about 5 $\mu$m to about 100 $\mu$m, more preferably from about 20 $\mu$m to about 50 $\mu$m. If the adhesive layer 3 is too thin, it may be that sufficient adhesive strength cannot be obtained. On the other hand, if the adhesive layer 3 is too thick, the adhesive may bleed out, and therefore the handling thereof becomes difficult.

The paint layer 4 is formed by directly coating the paint itself onto the adhesive layer 3. Accordingly, unlike the conventional colored films for painting such as a colored film that is produced by adding a paint or a pigment into a resin material of a film layer or a colored film formed by applying screen printing on a film base, the paint layer 4 of the present invention has good color reproducibility since it is formed of the paint itself. Therefore, even in the case of metallic color, good painting can be made without occurrence of uneven coloring (flashing) or streaking.

Such a paint layer 4 of the present invention that is composed of the paint itself can be formed into an extremely thin layer. This means that that the painting adhesive tape 1 as a whole can be made thin so that it has excellent flexibility and followability. Therefore, the painting adhesive tape 1 of the present invention can readily be stuck to curved portions such as corner portions or large area portions.

The paint that constitutes the paint layer 4 is not particularly limited to a specific paint; ordinary paints for painting external surfaces of automobiles can be used. Examples of such paints for painting automobiles include those containing as their major components a pigment and a base polymer for dispersing the pigment and the like.

Examples of the base polymer include urethane-based resins, epoxy based resins, polyester based resins, and the like. These resins may be optionally combined depending on the material of the surface to be painted. Among these resins, urethane based resins are particularly preferred. This is because the urethane-based resins are normally curable at a relatively low temperature, so that the paint layer 4 composed of such paint can be formed with ease.

As for the pigment, conventional pigments such as various organic pigments, inorganic pigments, natural dyestuffs and the like can be used. If paints contain brilliant pigments, paint layers that provide a metallic feeling can be formed.

The brilliant pigments are not particularly limited, and examples of such pigments include pearl pigments, solid pigments, metallic pigments such as aluminum pigments and the like which are conventionally used for paints for painting the external surfaces of automobiles. These brilliant pigments may be used alone or two or more of them may be used in admixture.

The shape of the particle contained in the brilliant pigments is not particularly limited, but a scale-like shape is preferred. Paints containing scale-like brilliant pigments can form paint layers that provide a metallic feeling with an improved appearance.

The thickness of the paint layer 4 when it is dried is preferably from about 5 $\mu$m to about 40 $\mu$m and more preferably from about 7 $\mu$m to about 20 $\mu$m.

If the thickness of the paint layer 4 is less than 5 $\mu$m, color development and concealability are insufficient, which results in a poor finish. On the other hand, if the thickness of the paint layer 4 exceeds 40 $\mu$m, productivity and appearance are lowered.

The clear coating layer 5 has a main function of protecting the paint layer 4, and it can be formed of a conventional clear coating agent for coating external surfaces of automobiles. Examples of the clear coating agent include those made of urethane-based resins, acryl-melamine based resins or the like. Among these resins, clear coating agents made of urethane based resins are preferred.

Since the urethane based resins can form sufficiently elastic and flexible paint layers, the painting adhesive tape 1 having such clear coating layer 5 will not be hardened. Further, such clear coating layer 5 has an excellent appearance and excellent luster as well as heat resistance, durability, weather ability and resistance to chemicals, and therefore such a clear coating layer is suitable as a clear coat to be laminated on the paint layer.

The clear coating layer 5 is preferably colorless and transparent. However, it may be colored if desired to such an extent that it does not completely conceal the paint layer 4 arranged below.

The thickness of the clear coating layer 5 is preferably from about 5 µm to about 50 µm and more preferably from about 5 µm to about 40 µm. By setting the thickness of the clear coating layer 5 to the range of from about 5 µm to about 50 µm, the clear coating layer 5 can sufficiently protect the paint layer 4 without impairing elasticity and flexibility of the painting adhesive tape. Further, such clear coating layer 5 also functions to impart the tape with excellent durability and excellent appearance.

The clear coating layer may be formed from a laminate of a plurality of clear coating layers. In this case, it is preferred that the total thickness of the clear coating layers be within the above-described range.

Furthermore, it is preferred that the painting adhesive tape 1 of the present invention has a protective tape (not shown) provided on the clear coating layer 5. Such a protective tape will be removed after attaching the painting adhesive tape 1 to an adherend. This can prevent the clear coating layer 5 from being damaged at the time of transportation of the adhesive tape 1 or of applying the tape to the painted surface with a squeegee. The base material of such a protective tape is not particularly limited, and films of polyvinyl chloride, polypropylene, polyethylene and the like may be used. The base material of the protective tape is preferably one having excellent elasticity. By use of such a base material, there is no fear that the flexibility or sticking ability of the painting adhesive tape will be impaired.

The adhesive used for the protective tape is not particularly limited, and the same adhesive as that used for constituting the adhesive layer 3 described above may be used. In this case, it is preferred to use adhesives composed mainly of acryl based resins, since such adhesives have stabilized adhesive strength and do not deteriorate the luster of the clear coating layer 5.

The painting adhesive tape 1 of the present invention preferably has a breaking strength from about 0.196 MPa to about 4.9 MPa and more preferably from about 0.49 MPa to about 2.54 MPa in a state where it is in use, that is, in a state where the tape 1 is constituted from the adhesive layer 3, paint layer 4, and clear coating layer 5. This makes the painting adhesive tape 1 have excellent flexibility and imparts it with sufficient followability when attaching it to a part having a large area or a curved part such as a corner part, and therefore the handling and workability are improved.

The painting adhesive tape 1 preferably has a breaking elongation of from about 10% to about 150% and more preferably from about 30% to about 100%. If the breaking elongation is less than 10%, the impact at a low temperature is deteriorated. On the other hand, if the breaking elongation exceeds 150%, there is a fear that the clear coating layer 5 will give a tacky or sticky feeling. Further, similarly to the above, by setting the breaking elongation to the range of about 10% to about 150%, the painting adhesive tape 1 can have excellent flexibility and sufficient followability when attaching it to a part having a large area or a curved part such as a corner part, and therefore the handling and workability are improved.

On a surface of the adhesive layer 3 of the painting adhesive tape 1 of the present invention, which is opposite to the surface on which the paint layer 4 is provided, a release sheet 2 may be laminated, if desired. Such a release sheet prevents attachment of dust or dirt on the adhesive layer 3 and blocking of the tapes until it is used, so that handling and storage properties can be improved.

As for the release sheet 2, any type of release sheet may be selectively used. For example, it is possible to use a release sheet that comprises a base material selected from films made of various resins such as polyethylene terephthalate, polybutylene terephthalate, polyethylene, polypropylene, and polyallylate, and various paper materials such as polyethylene laminated paper, polypropylene laminated paper, clay coated paper, resin coated paper, and glassine paper. On a surface of the above-described base material where it is to contact the adhesive layer 3, release treatment may optionally be made. In this case, typical examples of the release treatment include forming of a release agent layer made of a release agent, such as a silicone based resin, a long chain alkyl based resin or a fluoro resin.

In the painting adhesive tape of the present invention, it is preferred to use the film as the base material of the release sheet 2. In the case where such a film is used, the appearance of the painting adhesive tape can be improved and smoothness of the adhesive layer 3 can be ensured.

The thickness of the release sheet 2 is not limited to a particular value, but it is preferably from about 30 µm to about 200 µm.

The painting adhesive tape 1 can be used for painting vehicles such as automobiles, motorcycles, railway cars, as well as for painting buildings such as tanks and steel towers. Particularly, the painting adhesive tape 1 is used for painting vehicles such as automobiles. This tape can be also used for painting not only the outer surfaces but also other various portions such as resin made bumpers, interiors, and any other suitable parts.

By using the painting adhesive tape of the present invention, it is possible to provide a painting with an excellent beautiful image by a simple process. Further, it possible to cope with diversification of design with ease, so that the commercial value of automobiles and the like can be markedly improved.

The painting by using the painting adhesive tape 1 is performed as follows. First, the release sheet 2 usually is peeled off at the time of using the tape. Next, an end part of the tape is attached to the end portion of the surface of an automobile to be painted. Then, the tape, 1 is sequentially pressed against the surface using a rubber roller, squeegee or the like so that no bubble is formed between the surface and the adhesive layer 3. For example, by attaching the painting adhesive tape 1 of the present invention on a desired part on the outer surface of a completed automobile in the manner as described above, a two-tone color painting composed of the base color of the automobile body (body color) and the color (metallic color) of the paint layer can be made.

Of course, the form or shape of the painting adhesive tape of the present invention may include not only elongated tape-forms but also sheet-shapes, which has been cut into a desired size and shape.

Next, an example of the manufacturing method for manufacturing the painting adhesive tape of the present invention will be described.

The painting adhesive tape is manufactured as follows. First, a clear coating agent is coated on a process film made of a polyester resin to form the clear coating layer 5. The method for coating the clear coating agent is not particularly limited, and various coating methods such as brush coating, spray coating, dipping, or coating by use of roll coater, flow coater, curtain flow coater, knife coater, spin coater or the like can be selectively used.

Then, the paint layer 4 is formed with paint on the clear coating layer 5 to obtain a first step product.

The method for forming the paint layer 4 is not limited particularly, and various methods such as a die coater, a roll knife coater, a roll coater or a knife coater, or by curtain flow painting or spray painting can be used. Spray painting is preferred. By spray painting, the paints conventionally used for painting objects to be painted such as automobiles can be used as they are and thin and uniform paint layers can be formed in a short time. Furthermore, use of spray painting is particularly preferable since this can bring the particles of a pigment such as a brilliant pigment contained in the paint into a state where they are stacked as oriented in the direction of the thickness of the paint layer, that is, into a state where "the particles stand-up", so that a beautiful paint layer that has uniform color development of the pigment and metallic luster and which has excellent appearance can be obtained.

On the other hand, the adhesive layer 3 is formed on the surface of the release sheet 2 on which release treatment has been carried out. The adhesive layer 3 can be provided by a known method such as use of a die coater, a roll knife coater, a gravure coater, a reverse coater, a roll coater or the like.

Then, the release sheet 2 provided with the adhesive layer 3 and the first step product are applied to each other such that the adhesive layer 3 and the paint layer 4 are laminated one on the other to obtain the painting adhesive tape 1. The process film can be peeled off after laminating the first step product and the release sheet 2 and prior to winding the tape. Further, after the peeling off of the process film, a protective tape may be laminated on the clear coating layer 5, if desired, to obtain a painting adhesive tape 1 having such a protective tape.

Various known methods can be used for curing and drying the clear coating layer 5, the paint layer 4, and the adhesive layer 3. Further, the temperature at the time of curing and drying is not limited particularly, and may be set optionally depending on the kind of the constituent material of each layer.

Another example of the manufacturing method of the painting adhesive tape of the present invention is as follows. First, the adhesive layer 3 is formed on the release sheet 2. Next, on an exposed surface of the adhesive layer 3, the paint layer 4 is formed by spray painting or the like. Then, the clear coating 5 is laminated on the paint layer 4. Optionally the protective tape may be laminated on the clear coating layer 5. In this way, it is possible to produce the painting adhesive tape 1 having a protective tape.

As described above, the painting adhesive tape and the method for manufacturing the tape according to the present invention have been described with reference to the drawing. However, the present invention is not limited thereto. For example, the present invention is applied to a painting adhesive tape in which a desired treatment is made on the surface between the adhesive layer 3 and the paint layer 4, in order to prevent the migration of the paint or for some other purpose. The treatment to be carried out may include provision of a barrier layer and/or a protective layer having a thickness of 100 μm or less between the adhesive layer 3 and the paint layer 4. Also, thin films having various functions such as primer layers may be provided at any desired position so long as they do not impair the flexibility of the painting adhesive tape.

EXAMPLES

Actual examples of the present invention will be described.

1. Manufacturing of a painting adhesive tape

Example 1

A painting adhesive tape of the following construction was manufactured.

Clear coating layer:

The thickness of the layer was 30 μm, and it was formed of acryl-urethane based coating agent for painting the outer surface of automobiles ("PMH-240 Clear Coat", manufactured by Nippon Oils Co., Ltd.)

Paint layer:

The thickness (thickness when dried) of the layer was 15 μm, and it was formed of acryl-urethane based coating agent for painting the outer surface of automobiles ("PMH-100 Base Coat", manufactured by BASF NOF Coatings Co., Ltd. Al powder is included as the metallic pigment (the brilliant pigment)).

Adhesive layer:

The thickness (thickness when dried) of the layer was 45 μm, and it was formed of acryl based pressure-sensitive adhesive containing as its major component alkyl acrylate ("PAT 1", manufactured by Lintec Corporation).

The painting adhesive tape was made as follows. First, the clear coating layer 5 was formed on a process film made of a polyester resin ("T100E75", manufactured by Diawheel Hoechst Co., Ltd.) having a thickness of 75 μm using the above-described clear coating agent by spray coating using an air gun.

Then, after coating the paint by spray coating on the surface of the clear coating layer 5, the paint was cured and dried to form the paint layer 4, thereby obtaining a first step product.

The above-described adhesive was coated on the release treated surface of the release sheet 2 made of a polyethylene terephthalate resin ("PET100 S mat", manufactured by Lintec Corporation) having a thickness of 100 μm so as to have a thickness of 45 μm when dried, thereby forming the adhesive layer 3.

Then, the first step product and the release sheet 2 were stuck to each other such that the paint layer 4 and the adhesive layer 3 were laminated one another, and thereafter, the process film was removed, thereby manufacturing the painting adhesive tape 1 as shown in FIG. 1.

Example 2

The painting adhesive, layer 1 having a protective layer was manufactured in the same manner as in Example 1 except that a protective tape obtained by coating an acryl based adhesive on a polypropylene film (60 μm thick) so as to have a thickness of 20 μm ("LL-40", manufactured by Smilon Co., Ltd.) when dried was laminated to a surface of the clear coating layer 5 opposite to the surface where the paint layer 4 was coated, and that the thickness of each of the clear coating layer 5 and the paint layer 4 was set to 10 μm.

Next, for the painting adhesive tapes of the examples 1 and 2, the following tests (1) and (2) were carried out.

2. Evaluation of the physical properties of the painting adhesive tapes.

The breaking strength and breaking elongation of the obtained painting adhesive tapes (in a state where the release sheet 2 and the protective tape were eliminated) were measured. In this connection, the breaking strength and the breaking elongation were measured according to JIS K 7127, respectively.

The results obtained are shown in Table 1 below.

3. Evaluation of painting by the painting adhesive tapes (1) Appearance test

The painting adhesive tapes of the above examples were respectively attached to a part of the outer surface of a completed automobile having black body color.

Each painting adhesive tape was attached by the conventional method. First, an end portion of the release sheet 2 was peeled off to expose a part of the adhesive layer 3, and the part of the adhesive layer 3 was pressed against a predetermined end portion of the surface to be painted. After this positioning, the release sheet 2 was slowly peeled while pressing the adhesive layer 3 using a squeegee until the opposite end portion of the surface to be painted. In this step, care was taken so that no bubble was entrapped.

Thereafter, the appearance of the surface provided with painting by use of the painting adhesive tape was evaluated according to the following standards. In this regard, it is to be noted that the painting adhesive tape having a protective tape of Example 2 was subjected to the appearance evaluation in a state where the protective layer was removed after it was pressed.

⊚: Quite no uneven coloring or unevenness in luster was observed and the appearance was very good.

○: Almost no uneven coloring or unevenness in luster was observed and the appearance was good.

X: Appearance failure such as uneven coloring or unevenness in luster was observed.

The results obtained are shown in Table 1.

(2) Finishing test

The surfaces painted by use of the painting adhesive tape obtained in the respective examples 1 and 2 and the surfaces painted by directly spray coating the paints and clear coating agents used in the respective examples were compared with regards to the finishing states (color hue and luster) with the naked eye and evaluated according to the following standards.

⊚: The finish was quite the same and the both surfaces could not be distinguished with naked eye.

○: A slight difference was observed.

X: Clearly distinguished.

The results obtained are shown in Table 1.

TABLE 1

| Evaluation | Example 1 | Example 2 |
|---|---|---|
| | Example | |
| Breaking strength [MPa] | 1.96 | 1.764 |
| Breaking elongation [%] | 90 | 85 |
| Appearance | ⊚ | ⊚ |
| Finishing State | ⊚ | ⊚ |

These results show that the painting adhesive tapes of the respective examples are very flexible and can be attached to a corner portion or a large area portion or a surface to be painted with ease. Further, the painting can be made by a simple manner to give quite the same appearance as the case where the paints are directly sprayed.

Furthermore, the painting adhesive tape of the present invention is provided with the paint layer and the clear coating layer, which are integrally formed. Therefore, when the painting adhesive tape is used for painting automobiles with a body color of two-tone color, the painting of the two-tone color portion and the painting of the clear coating layer to be superimposed thereon can be eliminated. As a result, the amount of noxious volatile organic solvent that would occur in each step of spray coating can be decreased to a large extent.

Further, since the painting of the two-tone color portion and the painting of the clear coating layer on the two-tone color portion are eliminated, it is possible to eliminate the drying step therein, so that painting efficiency increases to a large extent.

As described above, according to the present invention, a painting adhesive tape having a paint layer formed of paint itself has been realized, so that quite the same finish as that obtained in the case where the paint is directly painted can be obtained. As a result, metallic color painting of a special color hue can be performed with good reproducibility.

Further, use of the painting adhesive tape of the present invention can simplify the painting process greatly so that productivity is markedly improved, resulting in a reduction of cost.

Furthermore, the painting adhesive tape of the present invention has good flexibility and followability to a curved surface as well as excellent handlability, so that it can be applied to many kinds of articles and designs and therefore it is expected to find many applications in various fields.

Finally, it is to be noted that, although the present invention was described above with reference to the embodiment and examples, the present invention is not limited thereto, and various modifications and additions may be made without departing from the sprit of the invention that is defined by the following claims.

What is claimed is:

1. An adhesive tape for painting, comprising:

an adhesive layer having a top and an opposing bottom surface;

a barrier layer having a thickness of 100 microns or less and having a top and an opposing bottom surface, the top surface adjacent the bottom surface of the adhesive layer;

a paint layer including a paint and having a first side adjacent the (top) bottom surface of the barrier (adhesive) layer; and a clear coating layer having a first side laminated on a second side of the paint layer, wherein the breaking strength of the adhesive tape is 0.196–4.9 Mpa and the breaking elongation of the adhesive tape is 10–150%.

2. The adhesive tape as claimed in claim 1, further comprising a protective tape which is laminated on a second side of the clear coating layer.

3. The adhesive tape as claimed in claim 2, wherein the protective tape is formed from a base film and an adhesive layer laminated on one surface of the base tape, and the protective tape is attached to the clear coating layer using the adhesive layer.

4. The adhesive tape as claimed in claim 1, wherein the paint contains urethane-based resin as a base material.

5. The adhesive tape as claimed in claim 4, wherein the urethane-based resin is an acryl-urethane based resin.

6. The adhesive tape as claimed in claim 1, wherein the adhesive layer is formed of a pressure-sensitive adhesive which contains acryl-based resin as a major component thereof.

7. The adhesive tape as claimed in claim 1, wherein the clear coating layer contains urethane-based resin as a major component thereof.

8. The adhesive tape as claimed in claim 7, wherein the urethane-based resin is an acryl-urethane based resin.

9. The adhesive tape as claimed in claim 1, wherein the thickness of the paint layer when dried is 5–40 µm, and the thickness of the clear coating layer is 5–50 µm.

10. The adhesive tape as claimed in claim 1, wherein the adhesive tape is used for painting vehicles.

* * * * *